United States Patent [19]

Diefendorf

[11] Patent Number: 5,106,894
[45] Date of Patent: Apr. 21, 1992

[54] FLUOROETHYLENE VINYL ETHER RESIN CONTAINING COATING COMPOSITION

[76] Inventor: Robert E. Diefendorf, 8282 Western Way Cir., Ste. 1102, Jacksonville, Fla. 32256

[21] Appl. No.: 672,470

[22] Filed: Mar. 20, 1991

[51] Int. Cl.$^5$ .......................... C08J 5/10; C08K 5/57; C08L 27/12
[52] U.S. Cl. .................................. 524/178; 524/315; 524/364; 524/365
[58] Field of Search ................. 524/178, 315, 364, 365

[56] References Cited
U.S. PATENT DOCUMENTS 4,416,941 11/1983 Barsotti .............................. 524/366

Primary Examiner—Paul R. Michl
Assistant Examiner—U. K. Rajguru
Attorney, Agent, or Firm—Thomas C. Saitta

[57] ABSTRACT

A surface coating composition comprising in combination between about 15 to 75 percent by volume fluoropolymer resin having UV absorbent properties, up to about 30 percent by volume acetic acid ester, up to about 60 percent by volume methyl amyl ketone, and between 1 to 20 cc per gallon dibutyltin dilaurate. To this mixture, a cross-linking/hardening agent is added in sufficient amount. Additional components may be added for specific application environments. The liquid composition can then be applied to the surface to be coated, where it will cross-link and harden adhered to the surface.

20 Claims, No Drawings

FLUOROETHYLENE VINYL ETHER RESIN CONTAINING COATING COMPOSITION

BACKGROUND OF THE INVENTION

Among the many uses of polymer resins, one area of widespread usage is that of surface coatings for application to surfaces to be protected from degradation caused by chemicals, the environment, etc. Preferably, the polymer coating is transparent so as not to interfere, block or discolor the coated surface. Surfaces such as plastic, metal or wood can be coated for protection.

Two major classes of polymer coatings currently known and in use are the acrylic resins and polyvinylidine fluoride resins. The acrylics have good properties with regard to transparency, gloss, cure temperature (ambient), recoatability and flexibility, but are poor against chemical degradation, UV absorption and have a short life of 3 to 5 years. The polyvinylidine fluorides have good properties with regard to chemical resistance, flexibility and weathering life (20 years), but are poor for gloss, cure temperature (250 degrees C.), UV absorption and recoatability.

It is an object of this invention to provide a polymer coating composition having the optimum properties of the common compositions, while not suffering from the individual drawbacks of these coatings. It is an object to provide a coating composition easily applicable to a variety of surfaces, the composition being highly transparent and having good properties in regard to adhesion, gloss, cure temperature, life span, chemical resistance, flexibility, recoatability and UV absorption. It is a further object to provide such a composition which also includes specific additives for particular application surfaces and environments.

BRIEF SUMMARY OF THE INVENTION

The composition comprises in combination between about 15 to 75 percent by volume fluorocarbon polymer resin, namely, fluoroethylene vinyl ether, having UV absorbent properties, up to about 30 percent by volume acetic acid ester, namely, oxy-heptyl-acetate, up to about 60 percent by volume methyl amyl ketone, and between 1 to 20 cc per gallon dibutyltin dilaurate. To this mixture, a cross-linking/hardening agent is added in sufficient amount, or the mixture is allowed to harden by evaporation of the solvent. The liquid composition can then be applied to the surface to be coated, where it will harden adhered to the surface.

For specific applications or environments, the composition may include additional components. For application to metal surfaces, up to about 10 ounces per gallon benzatriazol is added. For application in marine environments to inhibit barnacle and algae growth, up to about 6 ounces per gallon tetrachloroisophthalo nitrile and up to about 6 ounces per gallon of copper thiocyanate is added. For a high gloss surface on wood, 15 to 70 percent by volume of methacrylate resin and up to about 4 ounces per gallon of 3-iodo-2-propynal butyl carbonate is added. For a satin finish surface on wood, up to about 6 ounces per gallon of translucent red oxide, up to about 6 ounces per gallon of translucent yellow oxide and up to about 6 ounces per gallon silica dioxide is added to the high gloss composition.

DETAILED DESCRIPTION OF THE INVENTION

The composition comprises in combination the mixture of between about 15 to 75 percent by volume of a fluorocarbon polymer resin, namely, fluoroethylene vinyl ether, having UV absorbent properties, up to about 30 percent by volume acetic acid ester, namely, oxy-heptylacetate, such as for example sold under the trade name Exxate 700 solvent, up to about 60 percent by volume methyl amyl ketone, and between about 1 to 20 cc per gallon of the total composition dibutyltin dilaurate, such as for example sold under the trade name Fastcat 4202. The liquids are thoroughly mixed. To this mixture, when ready for application to a clean surface, a suitable amount of cross-linking and hardening agent may be added and mixed, such as for example aliphatic polyisocyanate, sold under the trade name Desmador 3390. Approximately up to 10 ounces of cross-linking and hardening agent per gallon of the total composition is required. This composition is then applied to the surface to be coated by brush, roller or spraying means and allowed to set-up. The composition may be applied to the surface to be coated without the addition of a cross-linking agent, in which case the composition will harden upon the evaporation of the solvent. The use of a cross-linking agent is preferred in situations where abrasion or exposure to solvents is anticipated. The preferred embodiment of this composition is illustrated in Example 1 below.

EXAMPLE 1

For a general purpose coating suitable for various applications, a preferred embodiment comprises the combination in a mixture of the following components, based on a total fluid volume of one gallon: 60 volume percent fluoroethylene vinyl ether resin having UV absorbent properties, 8 volume percent oxy-heptyl-acetate 32 volume percent methyl amyl ketone, and 4 cc of dibutyltin dilaurate. To induce cross-linking and hardening, 4 ounces of aliphatic polyisocyanate is added. This mixture is applied to the surface to be coated and allowed to cross-link and harden.

The cross-linked and hardened composition of Example 1 has the following properties:

| | |
|---|---|
| Fluorine content | 25 to 32 wt % |
| OH value | 40 to 150 mg KOH/g-resin |
| Acid value | 0 to 30 mg KOH/g-resin |
| Molecular weight | $M_n = 0.4$ to $10 \times 10^4$ |
| | $M_g = 0.8$ to $20 \times 10^4$ |
| Specific gravity | 1.4 to 1.5 |
| Morphology | glassy |
| $T_g$ of polymer | 0–70° C. |
| Decomposition temperature | 240–250° C. |
| Solubility parameter | 8.8 |

For application on certain metal surfaces, such as brass, copper or bronze, which suffer from relatively rapid oxidation and tarnishing effects, an additional component, benzatriazol, is added to the base composition prior to mixture with the cross-linking and hardening agent. This component, a solid such as for example sold under the trade name Cobra Tek, and is added in an amount up to about 10 ounces per gallon of the total composition. The preferred embodiment of the composition for this application is illustrated in Example 2 below.

EXAMPLE 2

For a coating suitable for use on brass, copper or bronze surfaces, the preferred embodiment comprises the combination in mixture of the following components, based on a total fluid volume of one gallon: 60 volume percent fluoropolymer resin having UV absorbent properties, 8 volume percent acetic acid ester, 31.75 volume percent methyl amyl ketone, 4 cc of dibutyltin dilaurate, and one quarter ounce benzatriazol. To induce cross-linking and hardening 4 ounces of aliphatic polyisocyanate is added. This mixture is then applied to the surface to be coated and allowed to cross-link and harden.

For application in marine environments, where the surface to be coated remains in the water for extended periods of time, such as a boat hull for example, tetrachloroisophthalo nitrile, such as for example sold under the tradename Nuicide 960, or copper thiocyanate, or both, are added to the base composition prior to addition of the cross-linking and hardening agent, in amounts up to 6 ounces per gallon of the total composition. These additives prevent the growth of algae or barnacles on the coated surface. The preferred embodiment of the composition for this application is illustrated in Example 3 below.

EXAMPLE 3

For a coating suitable for use surfaces in marine environments, such as a boat hull, where discouragement of barnacle and algae growth is desired, the preferred embodiment comprises the combination in mixture of the following components, based on a total fluid volume of one gallon: 60 volume percent fluoroethylene vinyl ether resin having UV absorbent properties, 8 volume percent oxy-heptyl-acetate, 31.5 volume percent methyl amyl ketone, 4 cc of dibutyltin dilaurate, one quarter ounce tetrachloroisophthalo nitrile, and one quarter ounce copper thiocyanate. To induce cross-linking and hardening 4 ounces of aliphatic polyisocyanate is added. This mixture is then applied to the surface to be coated and allowed to cross-link and harden.

For application on wood surfaces, such as teak, where a high gloss finish is desired, methacrylate polymer resin, such as for example sold under the trade name Acrylic resin UCD 99, in an amount between 15 to 75 percent of the total volume, and 3-iodo-2-propynal butyl carbonate, such as for example sold under the trade name Troysan Polyphase, in an amount up to 4 ounces per gallon of the total composition volume, is added to the mixture prior to the addition of the cross-linking and hardening agent. The preferred embodiment for this composition is illustrated in Example 4 below.

EXAMPLE 4

For a coating suitable for use on teak surfaces, where a high gloss finish is desired, the preferred embodiment comprises the combination in mixture of the following components, based on a total fluid volume of one gallon: 30 volume percent fluoroethylene vinyl ether resin having UV absorbent properties, 8 volume percent oxy-heptyl-acetate, 32 volume percent methyl amyl ketone, 30 volume percent methacrylate polymer, 2 cc of dibutyltin dilaurate, and one eighth ounce 3-iodo-2-propynal butyl carbonate. To induce cross-linking and hardening 4 ounces of aliphatic polyisocyanate is added. This mixture is then applied to the surface to be coated and allowed to cross-link and harden.

For coating a wood surface, such as teak, where a satin finish is desired, translucent red oxide, such as for example sold under the trade name Trans Red Oxide UCD 5891, in an amount up to about 6 ounces per gallon of the total composition volume, translucent yellow oxide, such as for example sold under the trade name Trans Yellow Oxide UCD 5721, in an amount up to about 6 ounces per gallon of the total composition volume, and silicon dioxide, such as for example sold under the trade name Flatting Agent OK 412, in an amount up to about 6 ounces per gallon of the total composition volume, is added to the components of the high gloss composition for wood, prior to the addition of the cross-linking and hardening agent. The preferred embodiment of this composition is illustrated in Example 5 below.

EXAMPLE 5

For a coating suitable for use on teak surfaces, where a satin finish is desired, the preferred embodiment comprises the combination in mixture of the following components, based on a total fluid volume of one gallon: 25 volume percent fluoroethylene vinyl ether resin having UV absorbent properties, 10 volume percent oxy-heptyl-acetate, 39 volume percent methyl amyl ketone, 25 volume percent methacrylate polymer, 2 cc of dibutyltin dilaurate, one eighth ounce 3-iodo-2-propynal butyl carbonate, one quarter ounce translucent red oxide, one sixteenth ounce translucent yellow oxide, and five eighths ounce silica dioxide. To induce cross-linking and hardening 4 ounces of aliphatic polyisocyanate is added. This mixture is then applied to the surface to be coated and allowed to cross-link and harden.

It is to be understood that the above examples are by way of illustration, and that obvious equivalents and substitutions may be known to those skilled in the art. The full scope and definition of the invention, therefore, is to be as set forth in the following claims.

I claim:
1. A coating composition comprising in combination:
   (A) between about 15 to 75 percent by volume fluorocarbon polymer resin fluoroethylene vinyl ether having UV absorbent properties;
   (B) from zero percent to about 30 percent by volume oxy-heptyl acetate;
   (C) from zero percent to about 60 percent by volume methyl amyl ketone;
   (D) between about 1 to 20 cc per gallon of dibutyltin dilaurate; and
   (E) a cross-linking agent in a range from zero percent to a sufficient quantity to achieve cross-linking and hardening.

2. The composition of claim 1 where said fluorocarbon polymer resin is present in an amount approximately 60 percent by volume, said oxy-heptyl-acetate is present in an amount approximately 8 percent by volume, said methyl amyl ketone is present in an amount approximately 32 percent by volume, and said dibutyltin is present in an amount of approximately 4 cc per gallon.

3. The composition of claim 1, further comprising up to about 10 ounces per gallon of benzatriazol.

4. The composition of claim 3, where said fluorocarbon polymer resin is present in an amount approximately 60 percent by volume, said oxy-heptyl-acetate is present in an amount approximately 8 percent by volume, said methyl amyl ketone is present in an amount approximately 31.75 percent by volume, said dibutyltin dilaurate is present in an amount of approximately 4 cc per gallon, and said benzatriazol is present in an amount of approximately one quarter ounce per gallon.

5. The composition of claim 1, further comprising up to about 6 ounces per gallon of tetra-chloroisophthalo nitrile and up to about 6 ounces per gallon of copper thiocyanate.

6. The composition of claim 5, where said fluorocarbon polymer resin is present in an amount approximately 60 percent by volume, said oxy-heptyl-acetate is present in an amount approximately 8 percent by volume, said methyl amyl ketone is present in an amount approximately 31.5 percent by volume, said dibutyltin dilaurate is present in an amount of approximately 4 cc per gallon, said tetra-chloroisophthalo nitrile is present in amount of approximately one quarter ounce per gallon and said copper thiocyanate is present in an amount of approximately one quarter ounce per gallon.

7. The composition of claim 1 further comprising between about 15 to 70 percent by volume methacrylate resin and up to about 4 ounces per gallon of 3-iodo-2-propynal butyl carbonate.

8. The composition of claim 7, where said fluorocarbon polymer resin is present in an amount approximately 30 percent by volume, said oxy-heptyl-acetate is present in an amount approximately 8 percent by volume, said methyl amyl ketone is present in an amount approximately 32 percent by volume, said dibutyltin dilaurate is present in an amount of approximately 2 cc per gallon, said methacrylate resin is present in an amount approximately 30 percent by volume, and said 3-iodo-2-propynal butyl carbonate is present in an amount of approximately one eighth ounce per gallon.

9. The composition of claim 1, further comprising between about 15 to 70 percent by volume methacrylate resin, up to about 4 ounces per gallon 3-iodo-2-propynal butyl carbonate, up to about 6 ounces per gallon translucent red oxide, up to about 6 ounces translucent yellow oxide, and up to about 6 ounces per gallon silica dioxide.

10. The composition of claim 9, where said fluorocarbon polymer resin is present in an amount approximately 25 percent by volume, said oxy-heptyl-acetate is present in an amount approximately 10 percent by volume, said methyl amyl ketone is present in an amount approximately 39 percent by volume, said dibutyltin dilaurate is present in an amount of approximately 2 cc per gallon, said methacrylate resin is present in an amount approximately 25 percent by volume, said 3-iodo-2-propynal butyl carbonate is present in an amount of approximately one eighth ounce per gallon, said translucent red oxide is present in an amount of approximately one fourth ounce per gallon, said translucent yellow oxide is present in an amount of approximately one sixteenth ounce per gallon, and said silica dioxide is present in an amount of approximately five eighths ounce per gallon.

11. A composition for coating upon mixing with a sufficient amount of aliphatic polyisocyanate to induce cross-linking and hardening, comprising in combination:

(A) between about 15 to 75 percent by volume fluorocarbon polymer resin fluoroethylene vinyl ether having UV absorbent properties;
(B) from zero percent to about 30 percent by volume oxy-heptyl-acetate;
(C) from zero percent to about 60 percent by volume methyl amyl ketone; and
(D) between about 1 to 20 cc per gallon of dibutyltin dilaurate.

12. The composition of claim 11 where said fluorocarbon polymer resin is present in an amount approximately 60 percent by volume, said oxy-heptyl-acetate is present in an amount approximately 8 percent by volume, said methyl amyl ketone is present in an amount approximately 32 percent by volume, and said dibutyltin dilaurate is present in an amount of approximately 4 cc per gallon.

13. The composition of claim 11, further comprising up to about 10 ounces per gallon of benzatriazol.

14. The composition of claim 13, where said fluorocarbon polymer resin is present in an amount approximately 60 percent by volume, said oxy-heptyl-acetate is present in an amount approximately 8 percent by volume, said methyl amyl ketone is present in an amount approximately 31.75 percent by volume, said dibutyltin dilaurate is present in an amount of approximately 4 cc per gallon, and said benzatriazol is present in an amount of approximately one quarter ounce per gallon.

15. The composition of claim 11, further comprising up to about 6 ounces per gallon of tetra-chloroisophthalo nitrile and up to about 6 ounces per gallon of copper thiocyanate.

16. The composition of claim 15, where said fluorocarbon polymer resin is present in an amount approximately 60 percent by volume, said oxy-heptyl-acetate is present in an amount approximately 8 percent by volume, said methyl amyl ketone is present in an amount approximately 31.5 percent by volume, said dibutyltin dilaurate is present in an amount of approximately 4 cc per gallon, said tetra-chloroisophthalo nitrile is present in amount of approximately one quarter ounce per gallon and said copper thiocyanate is present in an amount of approximately one quarter ounce per gallon.

17. The composition of claim 11 further comprising between about 15 to 70 percent by volume methacrylate resin and up to about 4 ounces per gallon of 3-iodo-2-propynal butyl carbonate.

18. The composition of claim 17, where said fluorocarbon polymer resin is present in an amount approximately 30 percent by volume, said oxy-heptyl-acetate is present in an amount approximately 8 percent by volume, said methyl amyl ketone is present in an amount approximately 32 percent by volume, said dibutyltin dilaurate is present in an amount of approximately 2 cc per gallon, said methacrylate resin is present in an amount approximately 30 percent by volume, and said 3-iodo-2-propynal butyl carbonate is present in an amount of approximately one eighth ounce per gallon.

19. The composition of claim 11, further comprising between about 15 to 70 percent by volume methacrylate resin, up to about 4 ounces per gallon 3-iodo-2-propynal butyl carbonate, up to about 6 ounces per gallon translucent red oxide, up to about 6 ounces translucent yellow oxide, and up to about 6 ounces per gallon silica dioxide.

20. The composition of claim 19, where said fluorocarbon polymer resin is present in an amount approximately 25 percent by volume, said oxy-heptyl-acetate is present in an amount approximately 10 percent by volume, said methyl amyl ketone is present in an amount approximately 39 percent by volume, said dibutyltin dilaurate is present in an amount of approximately 2 cc per gallon, said methacrylate resin is present in an amount approximately 25 percent by volume, said 3- iodo-2-propynal butyl carbonate is present in an amount of approximately one eighth ounce per gallon, said translucent red oxide is present in an amount of approximately one fourth ounce per gallon, said translucent yellow oxide is present in an amount of approximately one sixteenth ounce per gallon, and said silica dioxide is present in an amount of approximately five eighths ounce per gallon.

* * * * *